Figure 1:
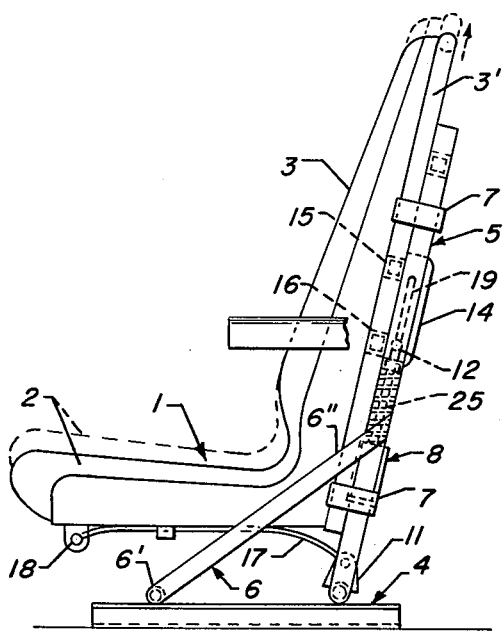

United States Patent [19]

Hogan

[11] 3,985,388

[45] Oct. 12, 1976

[54] VERTICALLY ADJUSTABLE SEAT WITH ENERGY ABSORBING MEANS

[75] Inventor: Gerard T. Hogan, Southington, Conn.

[73] Assignee: UOP Inc., Des Plaines, Ill.

[22] Filed: Aug. 11, 1975

[21] Appl. No.: 603,471

[52] U.S. Cl. .............................. 297/216; 244/122 R; 297/347
[51] Int. Cl.² ...................................... B60R 21/10
[58] Field of Search ................ 244/122 R; 297/216, 297/345, 346, 347

[56] References Cited
UNITED STATES PATENTS

| | | | |
|---|---|---|---|
| 2,971,566 | 2/1961 | Negroni | 297/216 UX |
| 3,381,926 | 5/1968 | Fritz et al. | 297/347 X |
| 3,861,637 | 1/1975 | De Longchamp | 297/345 X |

Primary Examiner—James C. Mitchell
Attorney, Agent, or Firm—James R. Hoatson, Jr.; Philip T. Liggett; William H. Page, II

[57] ABSTRACT

A special form of adjustable height seat, such as would be used for a pilot or crew member in a plane or helicopter, provides a generally vertical mounting arrangement for positioning of a seat height adjuster between a fixed height seat base and a slidable unitary seating section. In addition, the height adjuster means is provided with an energy absorption connection for at least one end portion thereof by having a movable portion in alignment with and available to be forced through a restricted section in the event of a crash landing situation.

4 Claims, 4 Drawing Figures

U.S. Patent  Oct 12, 1976  3,985,388

VERTICALLY ADJUSTABLE SEAT WITH ENERGY ABSORBING MEANS

The present invention relates to a special form of a vertically adjustable seat which incorporates energy-absorbing means.

More specifically, there is provided an adjustable height seat with energy-absorbing capability especially useful for a pilot or crewman in a helicopter or "Vertol" type of craft by reason of an energy-absorbing connection means being incorporated with the seat height adjustment means which is positioned to extend generally vertically between a fixed height seat base section and a seating section that can slide up and down in a seat supporting framework.

In connection with certain types of crew or passenger seats, particularly for airplane seating, there have been various designs and constructions which incorporate energy-absorbing devices so as to help prevent loss of life or injury in the event of a sudden stop or crash conditions. For example, telescoping tube means, with at least one tube being positioned and arranged to be forced through a hard orifice-like section, has provided means to absorb forward going crash situations. In this aspect, reference may be made to U.S. Pat. No. 2,959,207. Attention is also directed to U.S. Pat. No. 2,933,127 where stretchable metal strips are used to overcome violent deceleration conditions for a seat occupant. In U.S. Pat. No. 3,059,966, there are energy-absorbing means installed within generally vertical tubular support legs and with tubular-form diagonally positioned bracing in a support construction where there is an attempt to absorb vertical deceleration forces as well as overcome sudden stoppage of forward movement.

In view of the foregoing art types of energy-absorbing means, it must be recognized that various types of energy-absorbing devices have been used for airplane seats. Also, it is recognized that various types of spring means and deformable means have been proposed for use, or are in use, in connection with automobile bumper mountings. However, as will be set forth and described more fully hereinafter, it is believed that the present system of integrating an energy-absorbing connection means with a seat height adjuster means provides desirable and novel seat construction. Actually, the improved, simplified construction permits the use of a single centrally placed absorbing means along with the height adjustment means and to thus provide economy as compared to the types of constructions which must use energy-absorption in each of a pair of legs or bracing members.

It is thus a principal object of the present invention to provide a seat height adjuster means with a combined energy-absorbing linkage means.

It is also an object of the invention to provide a simplified arrangement whereby a single, centrally positioned, mechanical adjustment means is used to effect seat height adjustment and a special yielding linkage connection in combination therewith can serve to help absorb sudden deceleration forces.

In a broad embodiment, the present invention provides a vertically adjustable vehicle seat with impact energy-absorbing means, which comprises in combination: (a) a unitary seating section for the seat occcupant with a cushioned seat portion and an attached seat back portion, (b) a separate seat supporting framework including a base section for attachment to the vehicle and an upwardly extending framing portion to be adjacent the seat back portion of the unitary seating section, (c) a slidable attachment means between said upwardly extending framing portion and the seat back portion of said unitary seating section to provide a resulting guided support arrangement for such section, (d) an adjustable length weight supporting height adjuster means with lower end connection means providing attachment to the lower part of the seat supporting framework and with an upper end connection means to provide attachment to the seat back portion of the seating section, whereby the unitary seating section can be adjustably raised and lowered, and (e) at least one end connection means for said height adjuster means incorporating as a portion thereof a restricted section and a movable member to move therethrough to thereby effect a yielding engagement between the seating section and the supporting framework when there is a crash landing or a sudden deceleration of the vehicle.

Various types of yielding arrangements can be provided to form an energy-absorbing connection. For example, as is shown in the drawing, there may be a keyhole slot arrangement where a connecting pin engages a sized hole which will provide a bearing surface and in addition a narrowed slot connects with and extends upwardly from this working hole such that the shaft or pin means would be forced through the elongated slot to provide a yielding engagement. In other arrangements, there may be a tubular means sized to be forced through a narrow slot or orifice such that there would be a compressing of the tubular means to effect a yielding arrangement. Also, it is not intended to limit the invention to positioning the yielding connection for the seat height adjusting means to either the upper or lower portions thereof inasmuch as the energy-absorbing connection may be between the seat height adjustment means and the back of the unitary seat or, optionally, the yielding connection may be made between the lower end of the seat height adjustment means and its connection with the fixed height seat base. Actually, if deemed desirable, there may be yielding energy-absorbing connections at both end linkages for the seat height adjustment means.

Different types of seat height adjustment means may also be utilized in the present seat construction and it is not intended to limit the scope of the present invention to any specific form. One of the preferred types is a hydraulic lock which embodies a movable piston within a closed cylinder and a connecting movable piston rod member. Valving means in the cylinder that can be push-button operated provides for fluid flow through or around the piston member such that it is held in a desired position within the cylinder section of the lock. As a result, there can be small increments of piston rod adjustment by the seat occupant to, in turn, obtain any desired seat height within the limits of the piston movement of the hydraulic lock. One such type of hydraulic lock is commercially available as "Hydrolok" from the P. L. Porter Company. The hydraulic lock can also have spring assist means incorporated within its construction such that there is spring biasing to help elevate the seat when the fluid valving means is open and the seat occupant removes his weight from the seat. In lowering the seat, the occupant may, of course, make use of body weight to push the seat downward as the fluid valving is open to permit piston movement.

In addition to the hydraulic type of seat adjustment means, there may be utilized various forms of spring biased mechanical locks or linkages which will incorporate retractable pin means, tooth and rack means, braking members, and the like. As still another form of lock, there may be a positioning device which incorporates the use of a "traveling-nut" along with a threaded shaft or, conversely, the use of a fixed position threaded nut and a traveling threaded rod to move through the fixed nut such that there is resulting extensible and retractable linear movement. Reference may be made to U.S. Pat. Nos. 3,046,055 and 3,350,135, each of which illustrate and describe one form of positioning and adjusting device that could be utilized in effecting seat height adjustment. There may, of course, be other forms of suitable height adjustment means and, again, it is to be noted that it is not intended to limit the present invention to any one type of adjustment means in providing for the lifting and lowering of the unitary seating section.

With respect to the sliding engagement between the back portion of the unitary seating section and the upper seat supporting framework, there may be various forms of suitable guide means to accommodate adjacent tubular-form members. For example, the guide means may include rollers, ball bearings, etc., to assist in the differential movement between the two sections; however, suitable low friction, slide arrangements will generally provide for the desired height adjustment movements without undue problems.

Reference to the accompanying drawing and the following description thereof will serve to illustrate one embodiment of the present invention as well as assist in setting forth the advantageous features obtained in combining an energy-absorbing yielding engagement between the seat height adjuster means and its linkage between the seat base section and the seating section.

FIG. 1 of the drawing is a diagrammatic side elevational view indicating a unitary seating section and an upwardly extending seat supporting framework.

Figure 2:
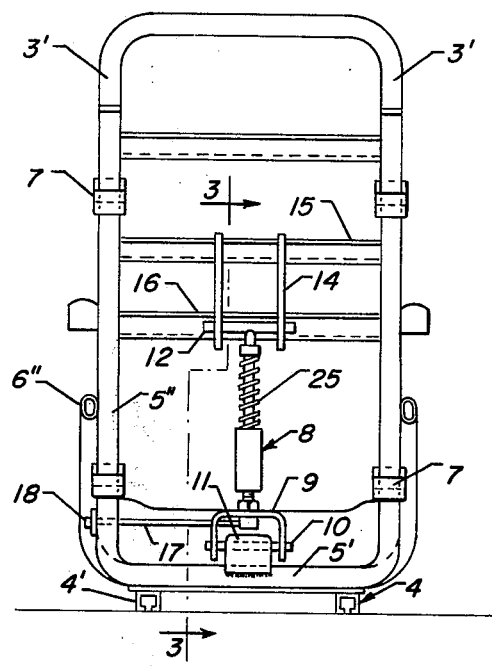

FIG. 2 of the drawing provides a rear elevational view showing a seat adjuster means centrally located at the back of the seating unit and extending generally vertically between its connections with a fixed seat base section and an intermediate area of the back portion of the unitary seating section.

Figure 3:
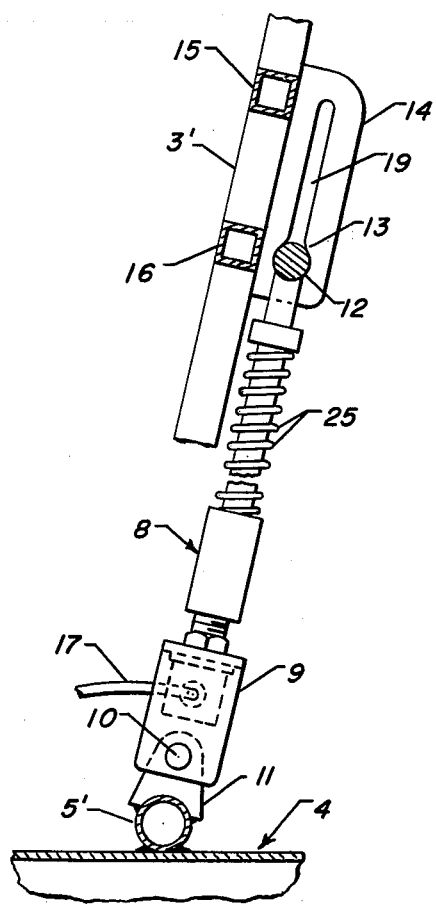

FIG. 3 of the drawing is an enlarged partial sectional elevational view, as taken along line 3—3 in FIG. 2, and illustrates a yielding upper end connection between the seat height adjuster means and the seat back portion of the seating section.

Figure 4:
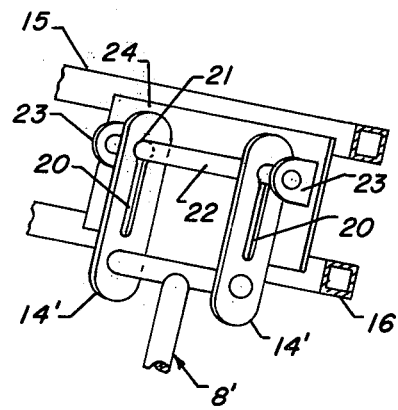

FIG. 4 of the drawing is a diagrammatic partial view indicating a modified form of yielding engagement where a pair of slotted bar means engage a fixed position rod means which, in turn, attaches to the seat back portion.

Referring now particularly to FIGS. 1, 2 and 3 of the drawing, there is indicated a unitary seating section 1 which has a cushioned seat portion 2 connecting with a seat back portion 3 such that the entire seating section can be raised and lowered together to provide a comfortable seating height for the seat occupant. There is also indicated a seat supporting framework which extends from a fixed height base section 4 and includes a generally vertical, upwardly extending tubular framework portion 5 and diagonal bracing 6. As best shown in FIG. 2, the upwardly extending framing 5 may comprise U-shaped tubular means with a lower horizontal portion 5' to attach to the base section 4 and upwardly extending leg portions 5'' to in turn provide guide and support means for the unitary seating section 1. The bracing 6 may also be of a tubular-form having a lower portion 6' to attach with the seat base section 4 and in addition have diagonal sections 6'' at each side of the seating unit to attach with the upwardly extending side portions 5'''. Where desired, the seat base section 4 may incorporate slotted tubular members such as 4' that are adapted to engage track means on the floor of the helicopter, airplane or other type of vehicle and, in turn, permit fore and aft positioning for the entire seat unit.

As heretofore noted, various types of sliding engagement means may be provided between the back portion 3 of the seating unit 1 and the upright portion 5 for the seat supporting framework; however, in the present embodiment, there is diagrammatically indicated the use of wide guide bands 7 which are placed in both upper and lower positions at each side of the framework between tubular portions 5'' and adjacent paralleling tubular members 3' which are attached to and provide structural framing for the unitary seating section 1. The spaced guide members 7 will, of course, provide support and alignment of the seating unit 1 from the upper portion of the seat supporting framework 5 while at the same time permitting a sliding engagement between two sections responsive to adjustment of a suitable seat height adjusting means which will be provided between the seat base section and a connection to the back of the seating unit.

As best shown in FIGS. 2 and 3 of the drawing, there is indicated a seat height adjustment means 8 that connects at its lower end to a yoke member 9 and a pin means 10 that extends through a supporting lug 11, which in turn connects with tubular member 5' on base section 4, while the upper end of the adjuster means 8 is provided with a cross pin member 12 which, in turn, engages holes 13 in special energy-absorbing plates 14 that are attached to spaced horizontal tubular members 15 and 16 which extend between the opposing tubular side members 3' for the seat back portion 3 of the unitary seating section 1. Thus, the extension and retraction of the height adjustment means 8 will in turn effect relative movement between the entire seating unit 1 and the seat supporting framework. The seat height adjustment means 8, as diagrammatically indicated in the drawing, is of the hydraulic type, such as heretofore described, with valving means being operable through a cable means 17 carrying to a suitable push-button means 18 at the side of the seating unit. This type of hydraulic lock is conventional with airplane passenger seating for seat back adjustment, and it is believed that detailed description of the internal operation of the locking means is unnecessary in connection with the present operation. Although optional, there is also indicated the use of a spring 25 in combination with the hydraulic lock means 8 such that there is a spring biasing or spring assist in effecting the lifting of the seating unit when the seat occupant temporarily moves his weight from the seat. It is, however, a principal feature of the present invention to provide for an energy-absorbing linkage in combination with the seat height adjuster means 8 and at least one end of its connective linkages to the seat base section 4 or the movable seating unit 1.

In the present embodiment, the seat height adjuster means 8 is centrally positioned so as to provide uniform lifting and lowering for the seating unit 1, with the upper end portion of the height adjuster being connected to the back portion of the seating unit as heretofore described. More specifically, and as best illustrated in FIG. 3, the cross pin member 12 connects with the plate members 14 through suitably sized holes 13 which in turn serve as bearing surfaces for the pin member such that there may be the normal lifting and lowering of the seating unit responsive to the movement of the piston within the adjuster means 8. However, in order to provide energy-absorption through a yielding type of engagement, there is an elongated slot means 19 provided within each of the plates 14 that, in each instance, extend from the lower holes 13 such that in the event of a crash landing, or undue deceleration of a craft utilizing the present system, there can be a forcing of pin means 12 through the elongated slots 19 to in turn effect absorption of impact forces from the weight of the seat occupant and the seating unit itself. The width of the slots 19 and the thickness of the plates 14, as well as the nature of the metals used in forming plates 14, should be correlated to provide an overall construction such that pin means 12 can force apart the plate metal along each slot 19 and gradually move the length of the slot to result in the desired yielding arrangement. Obviously where thin metals and relatively wide slots are utilized, there will be a more rapid movement of the pin means through the slots under impact conditions as compared to the utilization of narrow slots, thicker metals and less yielding types of metals.

While FIG. 3 of the drawing has indicated a yielding connection at the upper end of the seat adjuster means 8, it is to be recognized that this same type of connection may well be used between the lower end of the seat height adjuster means 8 and the seat base section 4, while a fixed unyielding arrangement is provided to the seat back section. Alternatively, similar yielding "keyhole" slot arrangements may be utilized in effecting the linkage connections at both ends of the seat height adjuster means such that there may be energy-absorbing linkages at both ends thereof. Also, as heretofore indicated, it is not intended to limit the present invention to any one type of yielding construction in effecting either the upper or lower connection means between a seat base section and a movable seating section.

In order to illustrate an alternative type of construction, reference may be made to FIG. 4 of the drawing, where there is indicated an upper movable end portion of a seat height adjuster means 8' being fixedly connected to plate members 14' which are provided with slot means 20 and enlarged holes 21 to engage a fixed position shaft 22 extending between lug means 23 from a plate member 24 in turn connecting with transverse tubular members, such as 15 and 16, for an adjustable height seating section. In other words, a modified arrangement provides that the slotted plate portions are attached to the seat height adjuster means 8' and energy absorbing through metal yielding will be accomplished by the relative movement of the slotted portions 20 with respect to the pin 22 such that the weight of the seat occupant in the seating unit is restrained and at least partially absorbed under crash conditions. Also, as heretofore indicated, other energy-absorbing arrangements may be utilized such as the use of deformable tube members moving through fixed sized openings or there may be combinations of the keyhole slot means and fixed sized orifice means with a deformable member to effect the desired energy absorption. However, it is a particular feature of the present arrangement from an economical construction aspect to combine the energy-absorbing means with the connection means or linkage in mounting the seat height adjuster means centrally and in a generally vertical position between a fixed seat base section and the movable seating unit such that there is an integrated and combined arrangement which can provide uniformity of operation, as well as uniformity in resisting rapid deceleration or crash landing conditions.

It is to be again noted that the present drawings are diagrammatic and that various modifications in design and contruction details will be obvious to those familiar with aircraft or passenger vehicle seating and that such modifications may well be considered to be within the scope of the present invention. Also where there has been reference to a fixed seat base section, it is to be understood that such base section is of a fixed height but may be moved fore and aft for a desired seat positioning in the particular craft.

I claim as my invention:

1. A vertically adjustable vehicle seat with impact energy-absorbing means, which comprises in combination:
   a. a unitary seating section for the seat occupant with a cushioned seat portion and an attached seat back portion,
   b. a separate seat supporting framework including a base section for attachment to a vehicle and an upwardly extending framing portion to be adjacent the seat back portion of the unitary seating section,
   c. a slidable attachment means between said upwardly extending framing portion and the seat back portion of said unitary seating section to provide a resulting non-pivoting and closely coupled guided support arrangement for such section,
   d. an adjustable length weight supporting seat height adjuster means with lower end connection means providing attachment to the lower part of the seat supporting framework and with an upper end connection means to provide attachment to the seat back portion of the seating section, whereby the entire unitary seating section can be adjustably raised and lowered, and
   e. at least one end connection means for said height adjuster means being in longitudinal alignment therewith and incorporating as a portion thereof a restricted section and a movable member to move there-through to thereby effect a yielding engagement between the seating section and the supporting framework where there is a crash landing or a sudden deceleration of the vehicle.

2. The adjustable seat of claim 1 further characterized in that said restricted section for a connection means for said height adjuster means comprises a slotted means in plates connective with said movable unitary seating section and said movable member comprises a transverse pin member connective to the height adjusting means such that there may be relative movement between the pin means and the slot means to effect the yielding engagement therebetween.

3. The adjustable seat of claim 1 further characterized in that the adjustable length seat supporting linkage means comprises a hydraulic lock type of unit with an external piston rod and internal piston means adjustable from the flow of fluid around the piston means in such lock unit.

4. The adjustable seat of claim 1 further characterized in that said adjustable length supporting height adjuster means is centrally located along the back and between the sides of the seat such that a single weight supporting height adjustment means will provide uniform raising and lowering of the unitary seating section and in addition will provide uniform energy absorption in combination with the connection means for one end of the height adjustment means providing a restricted section for a movable member to move therethrough.

* * * * *